Jan. 26, 1926.　　　　　　　1,570,805
G. WALLET
TROLLEY WHEEL
Filed July 9, 1925
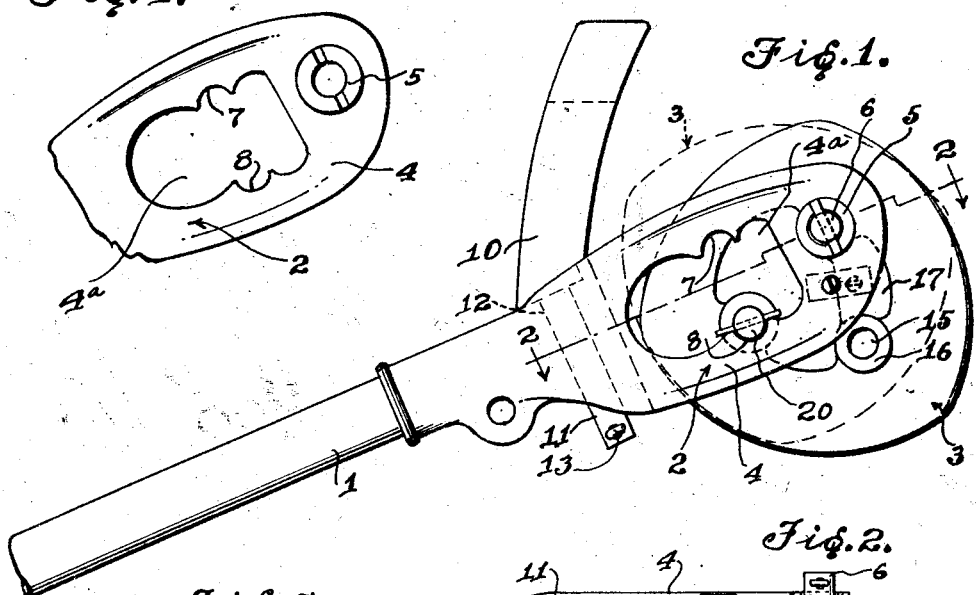
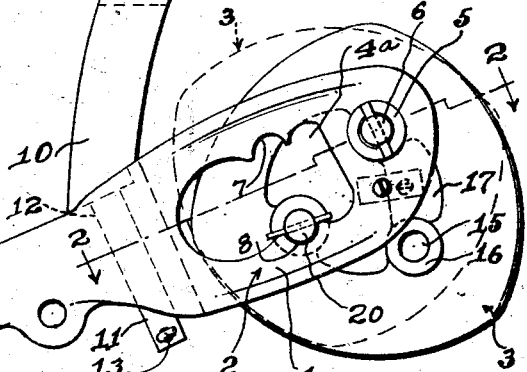
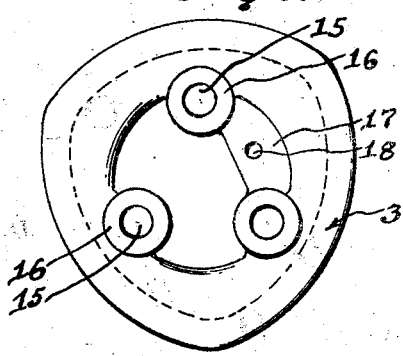
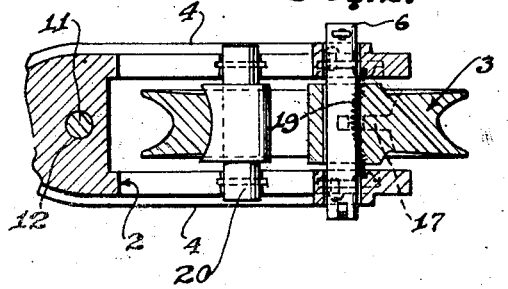
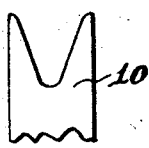
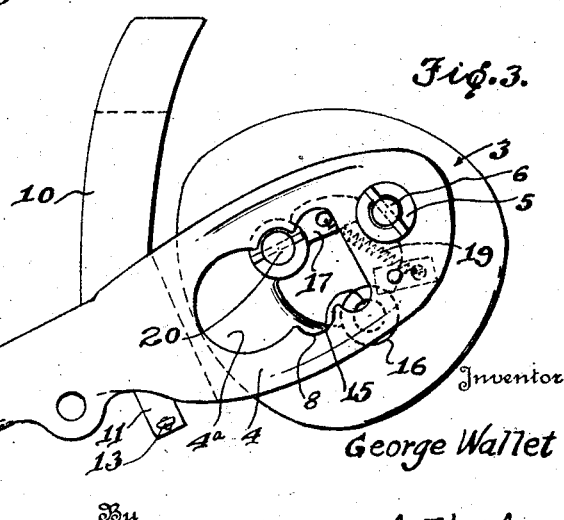
Inventor
George Wallet
By
J. Kaplan
Attorney Patented Jan. 26, 1926.

1,570,805

UNITED STATES PATENT OFFICE.

GEORGE WALLET, OF MILWAUKEE, WISCONSIN.

TROLLEY WHEEL.

Application filed July 9, 1925. Serial No. 42,483.

*To all whom it may concern:*

Be it known that I, GEORGE WALLET, a citizen of the United States, residing at Milwaukee, in the county of Milwaukee and State of Wisconsin, have invented certain new and useful Improvements in Trolley Wheels, of which the following is a specification.

This invention relates to trolley wheels for forming the trolley wire contact of an electric car.

The principal object of the invention is to provide a trolley wheel which is non-revolving and which can be set in three different positions in order to provide a fresh contact with the trolley wire when the wheel becomes worn in any of its set positions.

Another object of the invention is to provide a device of this character in which the trolley wheel is adapted to partly swing in the fork and a tension spring to pull the wheel back to its downward position.

Still another object of the invention is to provide a device of this class having a removable sleet cutter for cleaning the wire of sleet and ice during the winter.

Other objects will appear as the disclosure progresses. The drawings are intended merely to indicate a possible embodiment of the invention. It is obvious that the actual needs of manufacture may necessitate certain mechanical changes. It is therefore not intended to limit the invention to the embodiment illustrated, but rather to define such limits in the appended claims.

For a more detailed understanding of the invention, attention is now called to the drawings in which a preferred embodiment is shown illustrated. In these drawings, like parts are designated by like reference characters in all the views.

Fig. 1 is a side view of the device shown mounted in the forked end of the trolley pole.

Fig. 2 is a section on line 2—2 of Fig. 1.

Fig. 3 is a similar view as Fig. 1 with the trolley wheel in an upper position and having another pivoting point.

Fig. 4 is a view of the forked end of the trolley pole.

Fig. 5 is a view of the trolley wheel detached.

Fig. 6 is a detail of the ice and sleet scraper.

Referring now to the drawings in which like reference characters denote like parts throughout the specification, numeral 1 designates the usual trolley pole, 2 the forked end and 3 a trolley wheel mounted within the fork.

The fork 2 consists of wall members 4 having a bearing 5 at the top for the insertion of a pin 6, semicircular stops 7 and 8 for limiting the movement of the pin 9 and a cut out portion 4ª.

Fastened to the fork is a removable ice and sleet cutter 10 having a stem 11 which fits into a hole 12 of the fork and is kept in place by a cotter pin 13.

The trolley wheel is composed of a ring like member 14 having three perforations 15 in spaced relation to each other and surrounded by bosses 16. Between two of the perforations a web is provided having a hole 18.

The operation of this device is as follows:

The trolley wheel is inserted in the fork in the position as shown in Fig. 1. On contact with the trolley wire (not shown) the trolley wheel will swing upward against the tension spring 19 on its pivot 6 until the pin 20 will strike the stop 7 and take the position shown in dotted lines. When the contact between the trolley wheel and the trolley wire is broken or when the trolley car moves backward the tension spring 19 will swing the trolley wheel back to its original position. Should the trolley wheel wear out or be damaged so a proper contact with the trolley wire can not be formed in any of its set positions, a fresh contact can be presented to the wire by turning the wheel so same will swing on another pivoting point. Three different sliding contacts can be presented to the trolley wire assuring the wheel of a long life.

Having thus described my invention what I desire to secure by United States Letters Patent is:

1. In a device of the class described in combination, a trolley fork, a trolley wheel pivoted off center in said trolley fork, stops in said fork for limiting the arc of swing of said wheel, perforations in said wheel, a web having a hole therein between two of the said perforations and a tension spring passing through the said hole having the ends fastened to the said fork for returning the said wheel to its first position.

2. In a trolley pole having a fork at the end, a bearing at the top for swinging a trolley wheel therein, cut out portions at the sides, and two semicircular bearings for limiting the swing of the said trolley wheel.

3. In a trolley wheel, a ring like body member, a series of perforations having bosses at the ends in spaced relation to each other at the inner edge of the said ring like member, the said perforations adapted to act as a bearing for swinging the said trolley wheel and a web having a hole therein between two of the said bosses.

4. In a trolley fork, the combination of a trolley wheel, the said wheel composed of a ring like member, a series of perforations having bosses at the ends in spaced relation to each other at the inner edge of the said ring like member, a web between two of the said bosses, the said trolley wheel adapted to be pivoted off center in a bearing at the top of said fork, cutout portions at the sides of the said fork, two semicircular stops at the edges of the said openings and a tension spring passing through the said web and fastened to the two sides of the forked member.

In testimony whereof I affix my signature.

GEORGE WALLET.